United States Patent
Convertino et al.

(10) Patent No.: US 9,232,554 B2
(45) Date of Patent: Jan. 5, 2016

(54) METHOD AND SYSTEM FOR ENABLING MULTI-CHANNEL DIRECT LINK CONNECTION IN A COMMUNICATION NETWORK, RELATED NETWORK AND COMPUTER PROGRAM PRODUCT

(75) Inventors: Gabriella Convertino, Francavilla Fontana (IT); Carlo Parata, Matino (IT); Vincenzo Scarpa, Squinzano (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 1440 days.

(21) Appl. No.: 12/307,905

(22) PCT Filed: Jul. 19, 2006

(86) PCT No.: PCT/IB2006/002032
§ 371 (c)(1),
(2), (4) Date: Jan. 7, 2009

(87) PCT Pub. No.: WO2008/010007
PCT Pub. Date: Jan. 24, 2008

(65) Prior Publication Data
US 2009/0310578 A1 Dec. 17, 2009

(51) Int. Cl.
*H04W 76/04* (2009.01)
*H04W 72/04* (2009.01)
*H04W 76/02* (2009.01)
*H04W 84/12* (2009.01)

(52) U.S. Cl.
CPC ............ *H04W 76/043* (2013.01); *H04W 72/04* (2013.01); *H04W 76/021* (2013.01); *H04W 76/025* (2013.01); *H04W 84/12* (2013.01)

(58) Field of Classification Search
CPC ............ H04W 72/04; H04W 72/0446; H04W 72/1215; H04W 74/02; H04W 74/04; H04W 88/06

USPC .......................................... 370/331–333, 348
See application file for complete search history.

(56) References Cited

U.S. PATENT DOCUMENTS

| | | | |
|---|---|---|---|
| 6,791,996 B1 * | 9/2004 | Watanabe ............. | H04W 74/02 370/347 |
| 8,155,045 B2 * | 4/2012 | Sherman ............. | H04L 12/1881 370/312 |
| 2003/0054818 A1 | 3/2003 | Bahl et al. | |

(Continued)

OTHER PUBLICATIONS

PCT International Search Report; PCT/IB2006/002032; May 3, 2007.
LAN/MAN Standards Committee: IEEE Standard for Information Technology—Telecommunications and information exchange between systems—Local and metropolitan area networks—Specific Requirements; Part 11: Wireless LAN Medium Access Control (MAC) and Physical Layer (PHY) specifications; Amendment 8: Medium Access Control (MAC) Quality of Service Enhancements, IEEE Std 802.11e™-2005, XP002429954,Nov. 11, 2005, pp. 35; 79-95; 136-141; and 153-158; New York, NY USA.

(Continued)

*Primary Examiner* — Derrick Ferris
*Assistant Examiner* — Scott M Sciacca
(74) *Attorney, Agent, or Firm* — Allen, Dyer, Doppelt, Milbrath & Gilchrist, P.A. Attorneys at Law

(57) ABSTRACT

A wireless communication network includes an access point and a plurality of stations. The access point sends towards the stations periodic information arranged in time frames or beacon intervals. The stations in the network are configured to in a first mode through the access point, and in a second mode directly with each other. The time frames are partitioned into a first time interval wherein the stations communicate in the first mode over a first channel; a second time interval wherein the stations communicate in the second mode over a second channel, and a third time interval wherein the stations communicate in either of the first or the second mode.

30 Claims, 9 Drawing Sheets

(56) References Cited

U.S. PATENT DOCUMENTS

| | | |
|---|---|---|
| 2004/0090924 A1 | 5/2004 | Giaimo et al. |
| 2004/0218580 A1 | 11/2004 | Bahl et al. |
| 2004/0246934 A1 | 12/2004 | Kim |
| 2005/0025092 A1* | 2/2005 | Morioka ............ H04W 74/002 370/328 |
| 2005/0094588 A1 | 5/2005 | Wentink |
| 2005/0157674 A1 | 7/2005 | Wentink |
| 2005/0226183 A1 | 10/2005 | Penumetsa |
| 2005/0282551 A1 | 12/2005 | Tandai et al. |
| 2006/0050728 A1* | 3/2006 | Sung .................... H04L 12/413 370/448 |
| 2006/0050729 A1* | 3/2006 | Chen et al. .................... 370/450 |
| 2006/0104231 A1* | 5/2006 | Gidwani ....................... 370/328 |
| 2009/0310573 A1* | 12/2009 | Sim ....................... H04W 48/08 370/336 |

OTHER PUBLICATIONS

Lee et al., "The Case for a Multi-Hop Wireless Area Network", IEEE Infocom, 12 pp., Mar. 2004, Hong Kong.

Chen et al., "WIANI: Wireless Infrastructure and Ad-Hoc Network Integration," in Proceedings of IEEE International, Conference on Communications (ICC), pp. 3623-3627, May 16-20, 2005, Korea.

Yin et al., "Performance Improvements of Integrating Ad Hoc Operations into Infrastructure IEEE 802.11 Wireless Local Area Networks", Computer Communications, vol. 28, issue 10, 35 pp., Jun. 2005.

\* cited by examiner

METHOD AND SYSTEM FOR ENABLING MULTI-CHANNEL DIRECT LINK CONNECTION IN A COMMUNICATION NETWORK, RELATED NETWORK AND COMPUTER PROGRAM PRODUCT

FIELD OF THE INVENTION

The present invention relates to communication networks and was developed with specific attention paid to its possible application to wireless Local Area Networks (wireless LANs or WLANs).

DESCRIPTION OF THE RELATED ART

The IEEE 802.11 wireless LAN standard (IEEE Wireless LAN Edition. IEEE Std 802.11™-1999 Reissue 2003) stipulates that wireless stations can communicate with each other using one of two modes: the infrastructure mode and the ad-hoc mode.

In the infrastructure mode, sometimes referred to as Access Point (AP) mode, a wireless station, STA, is associated with an 802.11 Access Point and can send/receive data to/from the AP only. The set of stations associated to an AP is referred as Basic Service Set, BSS. An Intra-cell communication (i.e. a communication where the source and destination are in the same BSS) that is relayed by the AP will be referred to as "legacy BSS connection". The AP provides connectivity to external networks, as well as security functions (i.e. authentication, privacy and encryption) that allow wireless communications between authorized stations only.

In the ad-hoc mode, wireless STAs can directly communicate with each other directly. The main characteristic of an ah-hoc network is its limited temporal and spatial extent.

The infrastructure mode is thus mostly used when setting-up home or business connections: for that reason, this mode of operation is primarily considered in the following.

FIG. 1 of the annexed drawings represents a simple BSS that consists of an AP and two wireless stations STA1 (for instance, a set-top box) and STA2 (for instance, a TV set). The AP provides connection to an infrastructure network or other network (not shown), such as Internet, a Local Area Network (LAN), etc. According to legacy BSS rules, a traffic flow DF from STA1 to STA2, must be sent through the AP over a wireless path WP1, WP2.

The fact that transmissions are relayed via the AP ensures that a communication between two stations in a BSS is always possible, even though they are out of range with respect to each other. On the other hand, this causes a waste of possibly more than one half in the available bandwidth with respect to the case the same traffic DF were sent in ad-hoc mode.

An ad-hoc (direct) connection within a BSS could be certainly more effective, provided the quality of the direct link between STA1 and STA2 is good enough (low packet error rate, high data rate). This type of operation is not allowed by the IEEE 802.11 standard; to overcome this limitation, a new mode, called Direct Link Protocol (DLP) has been introduced in the new IEEE 802.11e amendment, approved by IEEE in September 2005 (see IEEE 802.11e-2005 IEEE Standard for Information technology-Telecommunications and information exchange between systems-Local and metropolitan area networks-Specific requirements Part 11: Wireless LAN Medium Access Control (MAC) and Physical Layer (PHY) specifications: Amendment 8: Medium Access Control (MAC)—Quality Institute of Electrical and Electronics Engineers, 11 Nov. 2005, ISBN: 0738147885).

This mechanism allows two stations such as STA1 and STA2 in FIG. 1 to communicate directly with each other, after a negotiation phase managed by the AP.

After this general introduction to the background of the invention, some significant documents known at present to the inventors will now be discussed. In this discussion and in the rest of this description the acronyms listed in the table below will be used.

| Table of acronyms | |
|---|---|
| AP | Access Point |
| BSS | Basic Service Set |
| DLM | Direct Link Mode |
| DLP | Direct Link Protocol (802.11e procedure) |
| E-STA | Enhanced STA: this is a Station (STA) that can use a direct link mode |
| IM | Infrastructure Mode |
| STA | A Wireless Station |
| TBTT | Target Beacon Transmission Time |
| TS | Traffic Stream |
| TSPEC | Traffic Specification |

As indicated, the inventors are aware of a number of documents that are of interest for the arrangement described herein. These documents include the following:

(1) P. Bahl, P. Bahl, "System and method for concurrent operation of a wireless device in two disjoint wireless networks", US-A-2003/0054818;

(2) P. Bahl, P. Bahl, R. Chandra "Method to enable simultaneous connections to multiple wireless networks using a single radio" US-A-2004/0218580;

(3) E. C. Giaimo, J. P. Pennock, P. Bahl, P Bahl, "Method and Apparatus for Wireless Routing on a Plurality of Different Wireless Channels". US-A-2004/0090924;

(4) M. Wentink, "Time-scheduled multichannel direct link", US-A-2005/0157674;

(5) M. Wentink, "Direct Link Protocol in Wireless Local Area Networks", US-A-2005/0094588;

(6) S. Penumetsa, "Systems and Methods for Implementing an enhanced multi-channel direct link protocol between stations in a wireless LAN environment". US-A-2005/0226183;

(7) S. Kim, "Wireless local area networks and methods for establishing direct link protocol (DLP) communications between stations of wireless local area networks". US-A-2004/0246934;

(8) S. Lee, S. Banerjee, B. Bhattacharjee "The case for a Multi-hop wireless Area Network". IEEE Infocom, Hong Kong, March 2004;

(9) J.-C. Chen, S. Li, S.-H. Chan and J.-Y. He, "WIANI: Wireless Infrastructure and Ad-Hoc Network Integration," in Proceedings of IEEE International Conference on Communications (ICC), Korea, pp. 3623-3627, 16-20 May, 2005;

(10) Z. Yin, V. C. M. Leung "Performance improvements of Integrating Ad Hoc Operations into Infrastructure IEEE 802.11 Wireless Local Area Networks", Computer Communications, vol. 28.10, 2005.

In documents (1) and (2), a method to connect a wireless device to two disjoint wireless networks, such as an infrastructure network and an ad-hoc network is presented. The method has been designed in such a way that the wireless device can expose two virtual wireless network adapters (with two distinct IP addresses). The protocol is not implemented at the MAC level, so the application "sees" two different networks with two different IP addresses. The application is in some way aware of the existence of these virtual networks and must decide which one to use. No PHY multi channel support is provided. The AP is aware of the protocol and no scheduling of the transmission opportunity is performed when working in ad-hoc mode.

The solution presented in document (3) is an extension of the solution of documents (1) and (2) with the addition of multi channel support. In the solution of document (3), the AP authorizes any direct link connection by managing the related negotiation phase. This implies that the AP must be modified to deal with this protocol (which means that this is not IEEE 802.11 compliant). Moreover, the problem of synchronization between stations operating in ad-hoc mode is not specifically addressed.

In documents (4) and (5), a technique to establish a direct link connection using multiple wireless channels is presented. Also in this case, the setup of this communication is obtained using an Access-Point-centric protocol.

Document (6) discloses a system to configure direct link connections between two wireless stations belonging to the same BSS. The arrangement allows the use of a different frequency channels for direct link connections. The stations periodically return in IM to receive downlink data from the AP. In document (6) a direct link connection is allowed only if the number of consecutive frames addressed to the intra-cell station exceeds a threshold value.

The AP is in any case involved: in fact, the selection of the frequency channel to be used for direct link connection is handled by the AP, and the AP exploits information about free frequency channels from the stations involved in the direct link connection to establish the channel to use. Switching between DLM and IM is obtained by terminating the direct link and rejoining the infrastructure BSS.

In document (7), a method to establish direct link connection between two stations is disclosed. The method heavily relies on the concept of distance between the two stations: the direct link connection is established only if the distance between the source and destination is less than the distance between the source and the AP. Stations must be equipped with Global Positioning System (GPS) to determine station location.

In document (8) the authors propose a "multi hop" 802.11-based WLAN architecture that combines an infrastructure network with ad-hoc connections. The proposed architecture is implemented at MAC-layer by exploiting four different approaches: unaware-AP and unaware-client, unaware-AP and aware client, aware-AP and unaware-client, aware-AP and aware-client. This prior arrangement uses the same channel for ad-hoc and infrastructure connections: this means that the traffic on the two networks is not isolated, which causes an increase in the channel contention.

Additionally, a mechanism to share information on available bandwidth between wireless stations is implemented by assuming that a station can work only in ad-hoc mode or in IM, so they do not need any buffering strategy. Ad-hoc stations are not associated to the access point.

In document (9) the concept of WIANI (Wireless Infrastructure and Ad-hoc Network Integration) is introduced. This is a hybrid approach that combines ad-hoc and IMs to extend range coverage. In the architecture described there are no APs providing services to nodes (this means that no security protocol is implemented). APs and stations use ad-hoc connections. APs are only used to forward/receive traffic, from the Internet. A specific routing protocol optimized for this architecture (load balancing zone forming protocol) is proposed.

In document (10), Yin and Leung propose a method to seamlessly integrate ad-hoc operations into IM. They optimize the intra-cell traffic using ad-hoc connections, and to achieve this goal they propose a modification in the exchange frame sequence called 2b ad-hoc awareness direct connection. The scheme allows all intra-cell packets to be received in the most efficient way: if the destination is directly reachable, the packet is received directly in the ad-hoc mode by the destination station; otherwise, the packet is forwarded by the AP as usual. This is achieved by inserting an extra 2b delay into the packet exchange sequence, so that the AP can sense whether the destination station responds to indicate successful direct delivery, and, if not, forward the packet normally. In that way, the same channel is necessarily used for both connection modes (infrastructure and hoc) and a modification of the MAC for both stations and access points is required.

OBJECT AND SUMMARY OF THE INVENTION

The object of the invention is to provide an improved arrangement that is exempt from the drawbacks and shortcomings of the prior art arrangements discussed in the foregoing.

According to the present invention, that object is achieved by means of a method having the features set forth in the claims that follow. The invention also relates to a corresponding system (primarily in the form of a station in a wireless network), a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus an architecture for WLAN cards that allows setting-up multiple, simultaneous 802.11 connections by using one WLAN card only. In such a preferred embodiment, the connections share the same data link and physical layers and the driver of the WLAN card that decides if and when to switch from a connection to the others. This makes it possible to implement networks where STAs can participate to both an infrastructure and ad-hoc network using different physical channels. In this way the STAs preserve all the advantages of an infrastructure connection (security, connection to external network) and at the same time maximize performance using different channels to transmit traffic to another node in the same cell (for example a multimedia streaming session). In such a preferred embodiment, the sender in the direct link connection autonomously selects the frequency channel to use; this is proposed through the negotiation protocol to the receiver that can eventually either reject the connection or propose a different channel, and the intervals where a STA communicates using the IM or the DLM alternate in a scheduled way while the station is always associated in the BSS.

The basic approach exploited in the arrangement described herein is somewhat similar to the 802.11e DLP except for some significant differences. In fact, the arrangement described herein:

does not require implementing the 802.11e Direct Link negotiation phase or any other amendment contemplated in the IEEE 802.11e specifications;

the AP is not involved in the negotiation phase, a standard legacy AP could be used;

allows two stations to directly communicate using a PHY channel different from the one used by the AP; and introduces an exchange data protocol that reduces contention in the direct link communication.

In brief the arrangement described herein exhibits a number of basic advantageous features.

A first one of these is AP legacy compatibility: all the modifications proposed to implement the arrangement described herein are related to the STA, the AP remains completely standard; legacy stations (STA) and any enhanced station (E-STA) implementing the DLM mechanism described herein will communicate with the AP using the standard 802.11 specifications. Obviously, the DLM mechanism may be used only between two E-STAs and when an E-STA is operating in DLM it cannot receive data from the AP. In order not to lose data, packets arriving to the AP and addressed to an E-STA that is operating in DLM are buffered on the AP. To achieve this goal without modifying the AP, the IEEE 802.11 Power Saving Mode (PSM) is exploited: an E-STA communicates to the AP its intention to be in PSM before starting a direct link connection over a different frequency channel. This will force the AP to buffer data for that station, until the station asks for buffered frames.

Additionally, the arrangement described herein achieves a remarkable improvement in terms of efficiency for at least three reasons:

intra-cell traffic is managed through a single hop connection;

the use of multiple channels allows legacy BSS and Direct Link traffic flows to be sent simultaneously;

in DLM, medium contention is reduced because access to the medium is scheduled and negotiated between E-STAs.

Finally, user transparency is fully preserved: mode switching is implemented at the MAC layer and it is transparent to users; applications do not need to know which mode has been selected for transmission. An E-STA remains always associated to the AP; in addition, for some time intervals, it can be connected in DLM with other BSS E-STAs. The exploitation of IM or DLM is negotiated on a per-flow basis. A new traffic stream (TS) is represented in the system as a set of QoS requirements (average data rate, maximum delay, maximum packet error rate). The system proposed herein includes a decision module (the Scheduler) that selects the best mode that can satisfy QoS traffic stream requirements. The initial decision taken by this module can dynamically be changed if network conditions vary (the same traffic stream can be sent for some time intervals in IM and for some others in DLM).

BRIEF DESCRIPTION OF THE ANNEXED DRAWINGS

The invention will now be described, by way of example only, with reference to the enclosed figures of drawing, wherein:

FIG. 1, which is representative of a basic WLAN BSS layout, has been already described in the foregoing;

DETAILED DESCRIPTION OF PREFERRED EMBODIMENTS OF THE INVENTION

Figure 1:
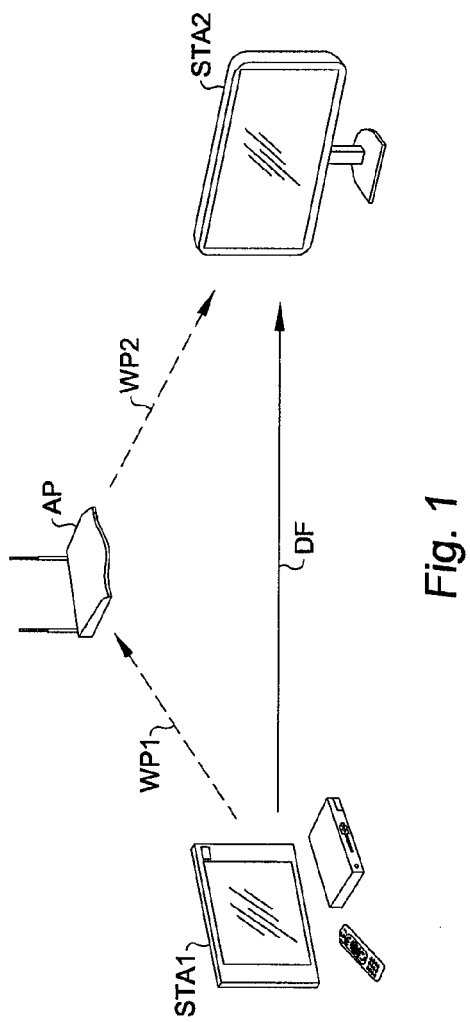

As indicated, in a general WLAN scenario, a wireless STA such as STA1 and STA 2 shown in FIG. 1, can operate in one of two possible transmission modes:

Infrastructure Mode (IM): STA1 and STA2 communicate through the AP as in a standard 802.11 BSS; this mode is obviously mandatory if either of STA1 or STA2 is the AP; or Direct link mode (DLM): two stations (STA1 and STA2) belonging to the same BSS directly communicate using an ad-hoc connection over an assigned channel.

The two modes introduce two alternative paths to connect the two BSS stations, namely a two hop path (STA1→AP→STA2) for IM and a single hop path (STA1→STA2) for the DLM.

The basic idea underlying the arrangement described herein can be briefly explained as follows.

Figure 2:
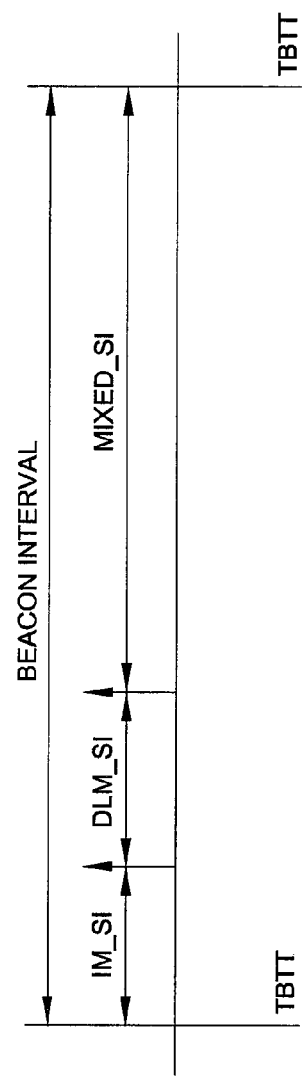
FIG. 2 is representative of a typical STA time frame.

The main time frame entity of a wireless STA is the beacon interval, shown in FIG. 2. Each beacon interval starts with a beacon frame. This is a management frame that the AP sends periodically, at each Target Beacon Transmission Time (TBTT), to the associated stations and that contains information used within the BSS to perform operations such as synchronization, association and power management. The beacon interval is the amount of time between two consecutive TBTTs: this is known to all the stations in the BSS since as it is communicated in the beacon frame itself.

In order to implement the DLM, periods in which a station works either in the infrastructure or in the direct link mode alternate in a beacon interval and use two different PHY channels: in the following, these two channels will be referred to as C and C1, respectively.

As shown in FIG. 2, the time frame of a Enhanced STA (E-STA) consists of 3 sub-intervals:

IM_SI is the time interval in which a station works in IM on channel C, that is as a standard legacy station. This interval has a fixed length (different from zero) and is known to all the stations in the BSS;

DLM_SI (or ADHOC_SI) is the time interval a station is on channel C1 and works in DLM. This interval is used to gather statistics on the direct link connections; and MIXED_SI is the time interval in which a E-STA may use the DLM or IM.

The sum of the three intervals designated MIXED_SI, DLM_SI and IM_SI is equal to the beacon interval.

Transmissions in the IM follow the standard 802.11 rules, while a transmission in the DLM must be negotiated between the sender and the receiver.

A protocol is used for that purpose as better detailed in the following. Such protocol does not involve any change in the Access Point. The negotiation is used to allocate direct link transmission opportunities, TXOP, that are bounded time intervals in which the STA is allowed to transmit a burst of frames in DLM. Each TXOP is defined by a starting time and a maximum duration. An allocated TXOP starts at a time t given as TBTT+OFFSET, where OFFSET>IM_SI+ DLM_SI. The TXOP duration is estimated on the basis of application QoS requirements and channel conditions, while the OFFSET is negotiated between the sender (i.e. STA1 resp. STA2) and the receiver (i.e. STA2 resp. STA1—that is the homologous station) in such a way that TXOPs on sender and receivers do not overlap.

Figure 3:
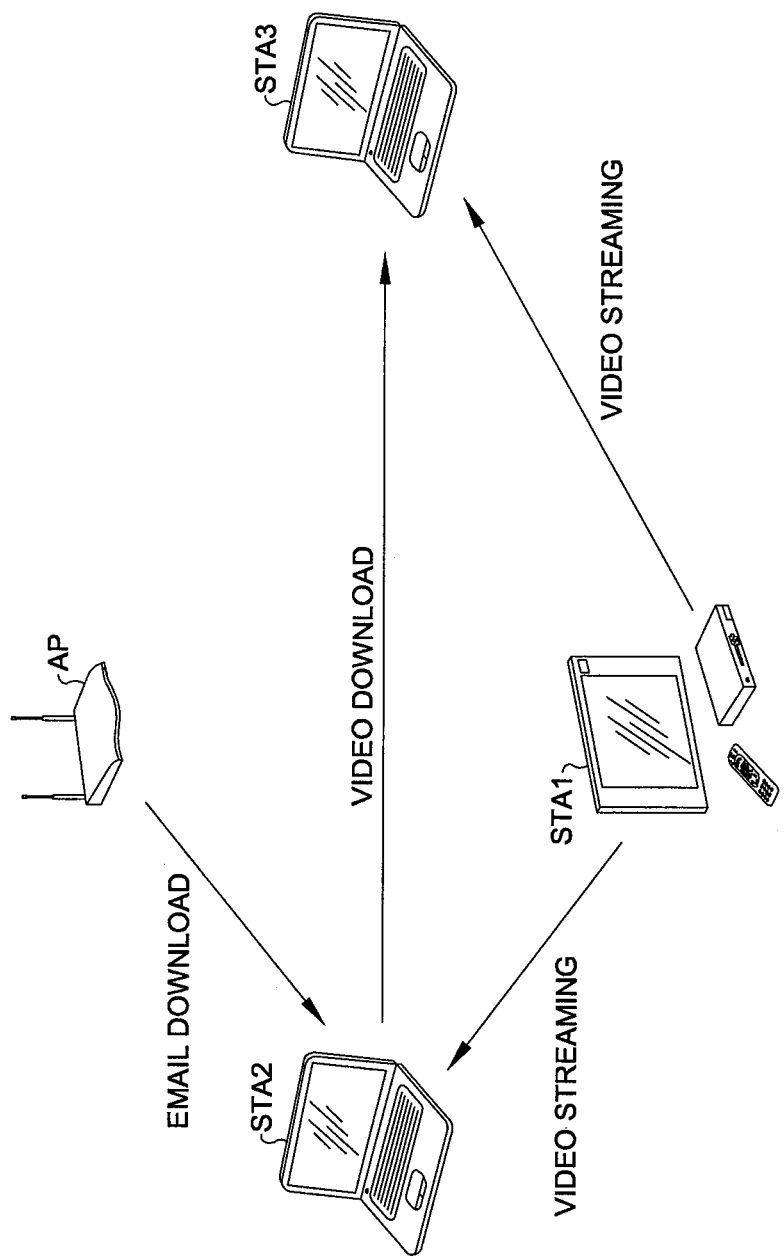
FIG. 3 is a block diagram of a home scenario for the arrangement described herein.

As an example, one may consider the BSS shown in FIG. 3 including an Access point AP plus three wireless stations STA1 (for instance, a set-top box), STA2 (for instance, a portable PC), and STA3 (for instance, another portable PC). The AP provides Internet access trough an Ethernet connection (not shown).

In addition to data flow (e.g. e-mail download) from the AP to STA2, three exemplary "intra" flows (e.g. video download from STA2 to STA3, and video streaming flows from STA1 to both of STA2 and STA3) could benefit of the direct link mode transmission.

A Scheduler module 100 (to be described later) may then assign DLM to all these three flows.

Figure 4:
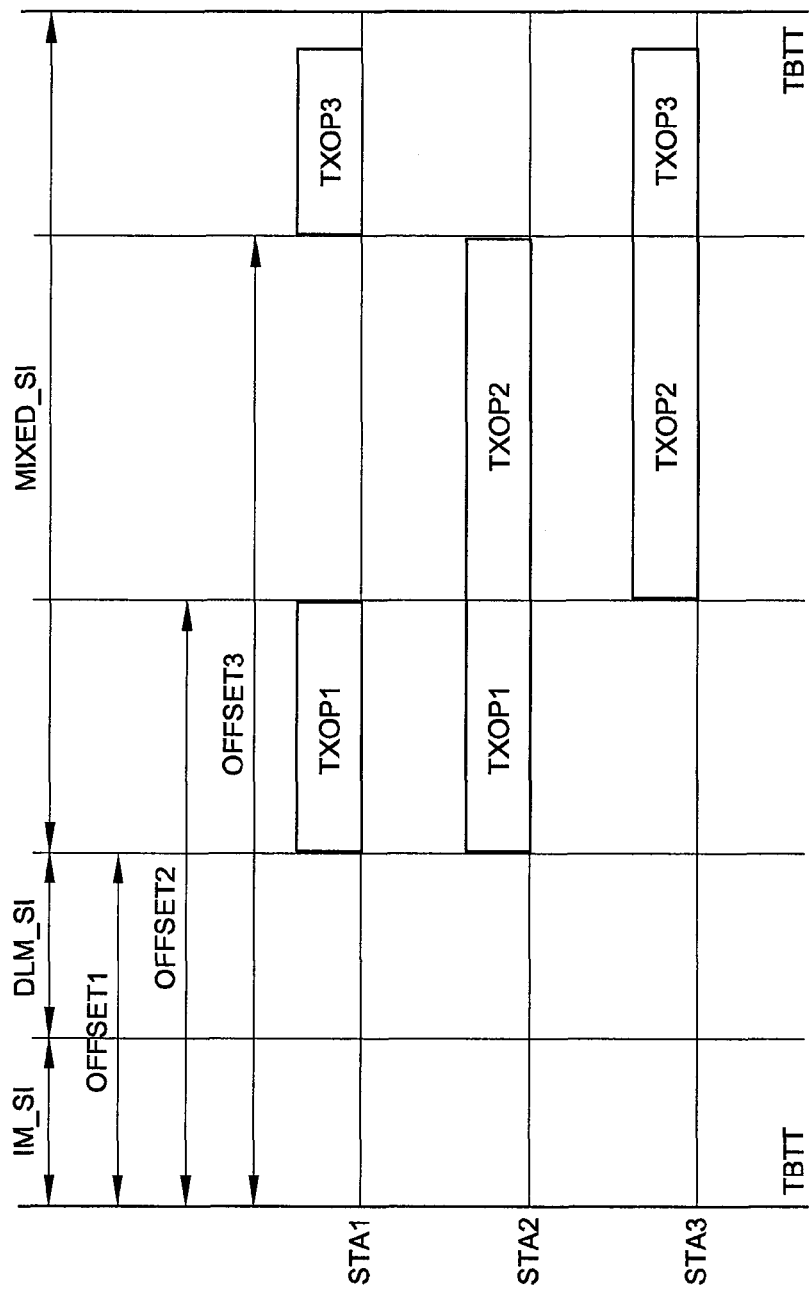
FIG. 4 is diagram representative of transmission opportunity allocation in the arrangement described herein.

FIG. 4 shows how the three related transmission opportunities (TXOP1, TXOP2, TXOP3) will be allocated by the three stations using the negotiation protocol to be described later. Essentially, three different offset values OFFSET1, OFFSET2, OFFSET3 will be associated to TXOP1, TXOP2, TXOP3 causing them to share three different, non-overlapping portions of the interval MIXED_SI.

In the example shown, the TXOPs at the three stations do not overlap and this greatly reduces contention on the direct link frequency channel. In general terms, there is no absolute guarantee that—if the number of E-STAs increases—all the allocated TXOPs will not overlap. An efficient implementation of the arrangement described herein will however at least aim at avoiding that the TXOPs allocated in all the E-STAs should overlap, so that contention, if not completely dispensed with, may be minimized.

Moreover, it will be generally assumed that IM is the default transmission mode, so that un-allocated intervals could be treated as IM TXOP. For example, considering the case in FIGS. 3 and 4, STA1 could switch from the DLM to the IM in the interval [OFFSET2, OFFSET3] where no TXOP is allocated. This can be done only if this time interval is greater that two channel switching time intervals. Channel switching time depends on the STA device implementation. A module, called Switch module 102, is introduced which is responsible for this decision.

A number of issues are to be properly dealt with in order to implement an efficient solution.

A first issue is related to optimal selection of the transmission mode.

As stated above, a decision module 100, called scheduler (see FIG. 4) is allotted the role of selecting the best transmission mode for a traffic stream (TS). The best mode is the one that can guarantee the QoS requirements of the TS and that can provide a better exploitation of the network resources.

The scheduler 100 uses a path metric M(P,F) defined on a path P and a traffic stream F, that takes a value in the range [0,1]. The value 0 is used to identify a path that can never satisfy QoS requirements of the traffic stream F. Paths with higher values of M should be preferred. The function M is evaluated for both the direct link path and the infrastructure path.

M is defined as the product of two components M=QoSMetric*(1−Cost). The former component, QoSMetric, is equal to 1 if P is able to guarantee QoS for F, 0 otherwise. The latter component, Cost(P,F), takes a value in the range [0,1] that is an indication of the resource network cost of that path for that traffic stream; 0 indicates the lowest cost and 1 the maximum. Paths with lower Cost(P,F) are preferred. While a currently preferred embodiment is described in the following by way of example, those of skill in the art will appreciate that the two functions QoSmetric and Cost can be defined in many alternative ways.

In a wireless environment, the link quality can change over time for many reasons, so the M function must be re-evaluated periodically; this means the best mode for a given traffic stream F could change over time. A dynamic switch between IM and DLM (or vice versa) is thus supported.

Another important factor is channel selection for the direct link connection.

The least noisy and least loaded channel is typically selected for direct link connections. This selection can be carried out in a number of ways that are known per se, thus making it unnecessary to provide a detailed description herein.

For the sake of this description one will assume that the E-STA (i.e. an application A, see also the flow chart of FIG. 6) that wants to establish a direct link connection will implement in a step 200 a function Select_Channel( ) that, if the channel in question exists (positive outcome of a step 202 in FIG. 6), will return the channel to use for DLM: in the proposed implementation a known, fixed-frequency channel is used.

Data buffering and synchronization is another significant factor that comes into play.

A station can simultaneously maintain infrastructure and direct link connections that use different channels. Since just a single channel at a time can be used to either transmit or receive, some data buffering is required at the station whenever it switches from one mode to the other. Finally, two stations that want to communicate in direct link mode are synchronized in such a way to be in direct link mode simultaneously.

Scheduling of the transmission opportunity (TXOP) in DLM is implemented in such a way to reduce contention inasmuch as possible. This means that only one station at a time is allowed to send data when operating in DLM.

Switching and Buffering functions will now be considered in detail.

STA Side

A STA that wants to start a DLM TXOP uses the 802.11 ad-hoc mode to communicate with the sink. Before performing any channel switching operation, all the information related to the IM (e.g. the BSSID) is stored and all data directed to the AP are buffered. The physical level of the wireless card is reset each time the need exists of changing the transmission mode and consequently the channel.

Before switching to DLM, an E-STA sends a packet to the AP with the Power Management Flag set on. In this way the AP is able to store packets sent to the E-STA on the infrastructure network. When the E-STA comes back to the infrastructure network, it sends a packet to the AP, the PS-Poll, in order to get all stored packets, as specified in the IEEE 802.11 standard.

The switch from DLM to IM is managed in a similar way.

AP Side

As stated above, the only requirement for the AP is to support the standard Power Saving Mode (PSM) feature of 802.11. According to the approach considered herein, a STA that is operating in DLM is considered to be in power save mode by the AP. This allows all traffic directed to a station to be stored at the AP while the station is in direct link mode (by using a different channel from the infrastructure network), thus avoiding packet losses.

According to the 802.11 standard, a STA in power saving mode awakes periodically, once every target beacon transmission time (TBTT). During sleep periods, the frames received by the AP and addressed to that station are buffered by the AP. When the PS station wakes up, it passes into a listening state to receive the beacon message (IM_SI, in FIG. 2). A beacon contains a field called Traffic Indication Map (TIM) which carries on the ID's of those PS stations with buffered packets in the AP. Any PS station reading its ID in the TIM will remain awake for the rest of beacon interval in order to receive the buffered frames. During the contention period, the delivery of one stored frame starts after the PS station has successfully sent a PS-POLL frame to the AP. The last buffered frame has the field More Data set to 0. The PS station can decide to go back to the sleep mode whenever it wants.

In the exemplary embodiment considered herein, all the stations awake at each TBTT, so that the presence of the IM_SI interval may be imposed in the main STA time frame (see FIG. 4).

Figure 5:
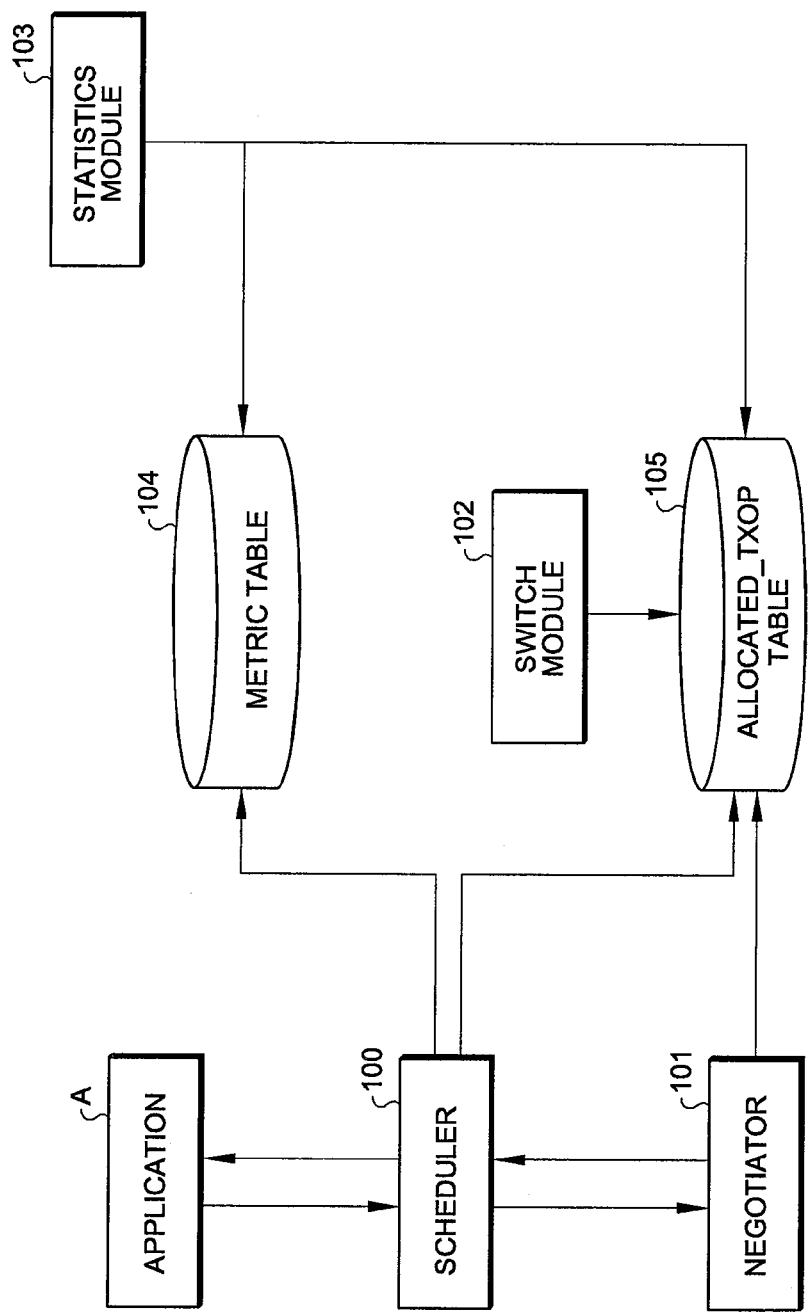
FIG. 5 is a main system block diagram the arrangement described herein.

Turning now specifically to the general system layout illustrated in FIG. 5, following the approach described herein, each E-STA includes the following blocks/modules:

- a Scheduler 100: this is responsible for admitting or rejecting a traffic stream originated by an application; the Scheduler will also be responsible for selecting the best connection path (infrastructure or direct link) and to compute the TXOP duration on the basis of the QoS requirements of the application. Moreover it will also be responsible for monitoring if QoS constraints are respected for each accepted flow;
- a Negotiator 101: this is responsible for setting-up a session with another E-STA using the DLM. The Negotiator 101 will negotiate with the receiver the TXOP (i.e. offset and duration) and the channel ID that should be used during the direct link session;
- a Switch module 102, responsible for scheduling the switches between IM and DLM and vice versa. The Switch module 102 is also responsible for the buffering operations on the E-STA;
- a Statistics monitor 103: this is responsible for updating a network metrics table 104 (to be discussed below: this is the table, managed by the scheduler 100, which contains information on the PHY/MAC statistics of the network) as well as an allocated transmission opportunity (TXOP) table 105, managed by the Scheduler 100 in cooperation with the Negotiator 101.

Figure 6:
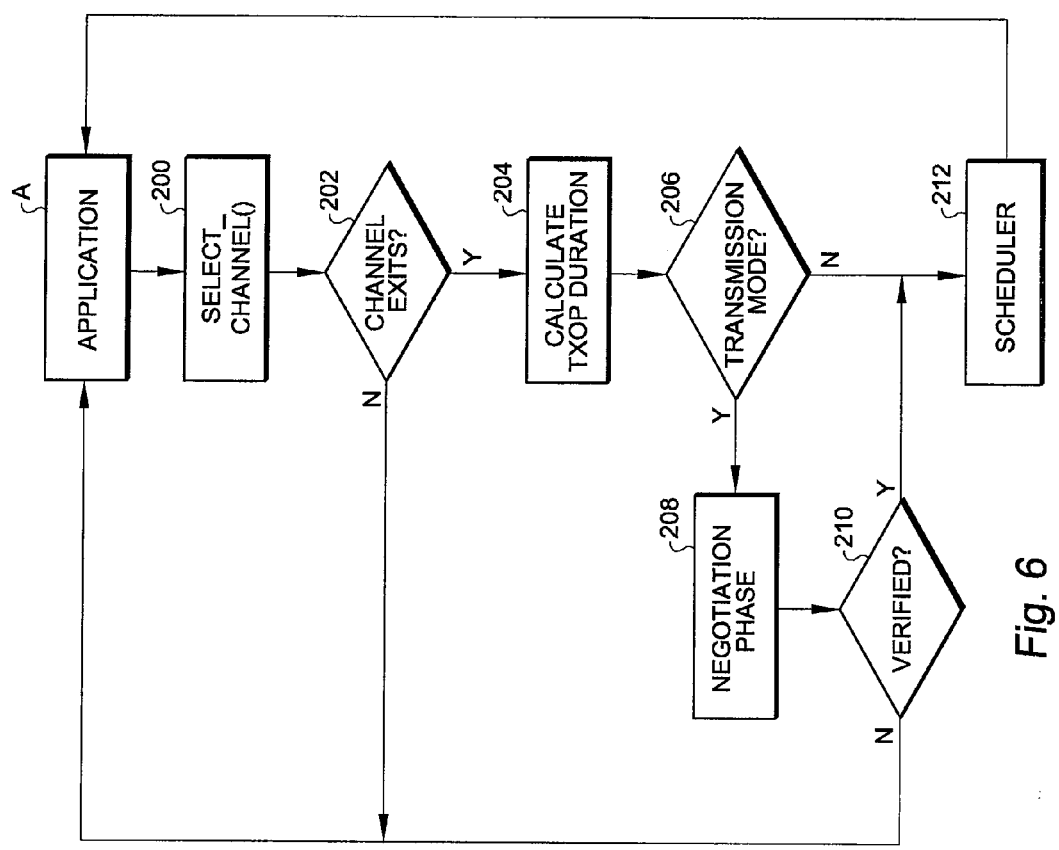
FIGS. 6 to 8 are flow charts of certain processing steps performed within the arrangement described herein.

In order to provide an example of interaction between the different modules introduced in the foregoing, the case will now be considered in connection with FIG. 6 of the initialization of a new traffic stream.

When an application A running on a Mobile Station (STA1) wants to start a traffic stream transmission to another Mobile Station (STA2), a structure, called TSPEC, is filled in containing the main QoS requirement of the traffic stream. The TSPEC is used by the Scheduler to admit/reject the flow (essentially on the basis of the best path selection steps 200 and 202 discussed previously) and then to compute, in a step 204, the related TXOP duration. A detailed description of the TSPEC format is provided in the following.

Specifically, on the basis of the information contained in the TSPEC structure, in a step 206 the Scheduler 100 will opt for either of the two allowed transmission modes: DLM or IM. Once the mode is selected, the Scheduler 100 will compute the network resources that should be reserved for the new traffic stream. That is the scheduler computes, in a step 204, the time interval, TXOP duration which should be allocated (each beacon interval) to the traffic stream in order to satisfy the QoS requirements expressed in the TSPEC.

If the selected mode is the DLM (positive outcome of a step 206) then a negotiation phase 208 (to be further detailed in the following) with the receiver station is started.

As indicated, the basic aim pursued here is ensuring that the receiver is able to support the DLM and the suggested TXOP does not overlap another one the receiver itself is currently using.

Under the assumption that all the allocated TXOPs are not overlapping both at the sender and at the receiver, each TXOP (e.g. TXOP1, TXOP2, TXOP3 in FIG. 4) will have a start time, called OFFSET (i.e. OFFSET1, OFFSET2, OFFSET3, that is a respective time interval starting from the TBTT), which is established by the Negotiator 101 on the basis of a negotiation between the stations involved in the DL connection.

The list of the allocated TXOPs is maintained in the table 105 as better detailed in the following. The Negotiator 101 will use this table to verify if the TXOP can be locally managed (i.e. there is enough free time in the beacon interval) and then activate a signaling protocol to verify that the estimated TXOP is suitable also for the receiver.

If all the verification steps are completed successfully (positive outcome of a step 210), the Negotiator 101 sends a response to the Scheduler 100 conveying the starting time of the DL connection (OFFSET). In a step 212, the Scheduler 100 updates the allocated TXOP table 105 and notifies the success to the application A.

If any verification fails (negative outcome of the step 210), the Negotiator 101 notifies the rejection to the Scheduler 100 using a code that indicates the reason of the failure (e.g. Beacon Interval full). When the Scheduler 100 receives a rejection message from the Negotiator 101, it could decide either to stop the flow or to use the IM.

The Scheduler 100 is also responsible for monitoring the data transmissions and, if some flows do not respect their QoS requirements, the Scheduler 100 can decide to renegotiate the TXOP or to change the transmission mode (e.g. to switch from a DL connection to an Infrastructure connection, which would lead to a negative outcome of the step 206), or to tear down a flow by notifying the application A correspondingly.

Figure 7:
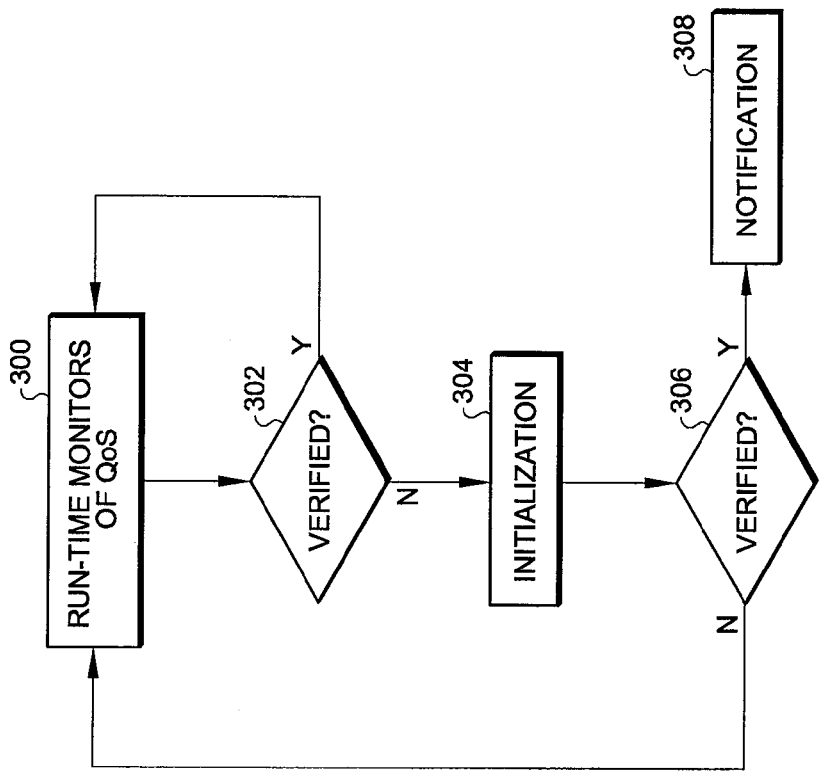

The main actions performed by the scheduler 100 are thus summarized in the flow charts of FIGS. 6 and 7 that refer to the initialization function and the run-time QoS monitoring function, respectively.

As regards best Path Selection (step 200 of FIG. 6), in the arrangement described herein a traffic stream between two stations (e.g. STA1 and STA2) may use either of two alternative modes: DLM and IM. Each mode is associated with a different path: direct link (STA1→STA2) or infrastructure path (STA1→AP→STA2). In the following the two alternative paths will be referred to as PDL and PI, respectively.

The Scheduler 100 is responsible for selecting the path that can guarantee application QoS requirements while optimizing the network resource allocation.

As a practical example, one may consider the following application QoS requirements:

Delay Bound: the end-to-end delay;

Average Throughput: the mean (i.e. average) amount of data bytes correctly received in a certain time interval;

Max PER: The maximum rate of packet losses that can be tolerated by the application.

These requirements are expressed by the TSPEC structure defined in Table 3 at the end of this description.

In order to select the best path a metric function M is introduced which allows:
- to state if a path is able to guarantee the QoS application requirements (QoSMetric);
- to compare the two alternative paths in order to identify the one that can provide a better exploitation of the network resources (Cost function).

As already explained in the foregoing, if a path between two stations is denoted as P and a traffic stream is identified by F, the metric function M (P,F) will preferably take the form of a product $M(P,F)=QoSMetric(P,F)*(1-Cost(P,F))$ where the former component of the metric identifies the paths that satisfy the application requirements while the second is used to select the path that can better exploit network resources.

QoSMetric(P,F) is a function that returns 0 if the path P cannot guarantee QoS requirement of F and 1 otherwise. The function Cost(P,F) returns a value which is the cost related to the path P: it is a value in the range [0,1], where 1 means the maximum cost and 0 the minimum cost. The path with the lower value of Cost(P,F) will be preferred. The path that returns the highest value of M should be selected. A path with M equals to 0 should never be selected.

In defining the functions QoSMetric and Cost, two aspects are taken into account: the definition of a formula that can effectively account all the relevant application and network metrics and the reliability and measurability of these metrics.

While, in general terms, each implementer could define the functions QoSMetric and Cost as desired, a currently preferred implementation is described by way of example. Specifically, in the following a list is provided of the network statistics that are currently held to be relevant for QoSMetric and Cost functions independently on the specific implementation.

Before listing the network metrics considered to be relevant, some definitions are introduced: a path (P) is represented by a set of nodes (n) and a set of links (l). Each link connects two nodes.

One can represent the direct link path (PDL) and the infrastructure path (PI) between two stations, STA1 and STA2, in terms of nodes or links as follows:

$PDL_n=\{STA1, STA2\}$ $PDL_l=\{1_{STA1,STA2}\}$
$PI_n=\{STA1, AP, STA2\}$ $PI_l=\{1_{STA1,AP}, 1_{AP,STA2}\}$

Some of the network metrics that impact the QoS of wireless applications and that can be used to evaluate the cost function of a specific path are listed below:
- Hop Count: this is the number of links in a path (1 for PDL, 2 for PI). This metric can influence the application delay and the network load. If a path can satisfy the related QoS application requirements, then the shortest path (i.e. the minimum number of links) should be preferred;
- PER: the packet error rate of a path is measured end to end and it is due to the combination of the packet losses on each specific link;
- Delay: this is the mean time required to correctly deliver a packet along a path. This metric can be difficult to measure without an explicit feedback from the receiver;
- Buffer level: this represents the transmission buffer depth on each node in a given path. This is an indication of the network load and the delay on a specific path. This metric may be difficult to estimate for intermediate nodes;
- PHY data rate: this is the mean PHY data rate to transmit a data packet from the source to the destination. It is an index of the noise level of a path. Difficult to measure in multi-hop paths;
- Power Level: this parameter is a combination of the power levels used by each node in the path. It is an indication of the network cost, since nodes that transmit at lower levels (less interference, less energy consumption) are preferred.

The network statistics useful for the QoSmetric and Cost function implementation are stored in the table 104 of figure, designated METRIC_TABLE, which is periodically updated.

Table 5 at the end of this description provides an example of the statistics used in the exemplary implementation discussed here; examples of estimation and update of these statistics will be provided in the following.

In the TXOP duration calculation step 204 in FIG. 6, the Scheduler 100 uses information contained in the TSPEC and in the METRIC_Table 104 to compute therefrom the TXOP duration.

An example of TXOP duration estimation is provided in the following. The effective allocation of the TXOP will be performed by the Negotiator 101 that will verify if the TXOP duration estimated by the Scheduler 100 can be locally managed according to the already allocated TXOPs.

The Run-time Monitoring function of QoS (represented by a block 300 in FIG. 7) is responsible for verifying (step 302) that QoS application requirements are satisfied and that allocated TXOPs are sufficient to maintain application requirements. If the check of step 302 provides a positive outcome, the monitoring function loops over itself.

Since the channel conditions (i.e. the channel capacity) fluctuate, the current PHY rate used to transmit frames may not be sufficient to minimize the packet losses and this may cause the wireless card to start some link adaptation processes (i.e. to change the PHY rate). When the PHY rate is reduced, the time for transmissions increases and the allocated TXOP could become inadequate (i.e. the delay increases).

The QoS may thus no longer be guaranteed and the check of step 302 may consequently yield a negative outcome: a TXOP re-negotiation is needed, which involves repeating the initialization (step 304 of FIG. 7).

If (re)initialization succeeds (positive outcome of check performed at 306) the monitoring function returns to step 300.

If (re)initialization fails (negative outcome of check performed at 306) the flow is stopped and the application A is notified of this failure in a step 308.

A similar approach is adopted when link conditions improve (TXOP duration reduction).

The Negotiator 101 is the module responsible for verifying if a TXOP with a given duration can be locally allocated and to negotiate the TXOP with the receiving E-STA.

Figure 8:
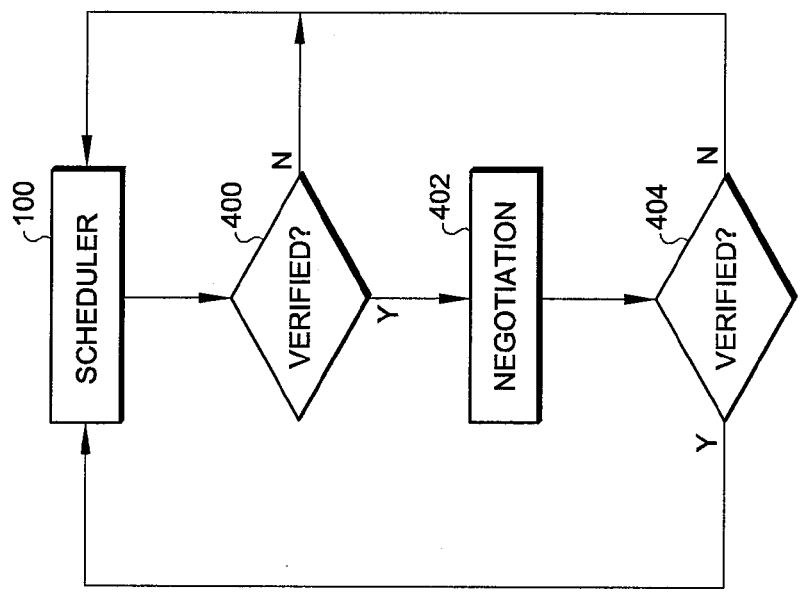

As detailed in the flow chart of FIG. 8, the negotiator 101 performs the following actions:
- locally verifying, in a step 400, that a TXOP can be allocated (DL originator side);
- negotiating, in a step 402, TXOP OFFSET and Channel ID with the receiver (DL originator side) if the step 400 yields a positive outcome;
- running the negotiation step 402 in order to possibly answer a negotiation request (DL receiver side).

The two first actions listed are performed if the Negotiator 101 is activated by the local Scheduler 100 (this means that the station is the originator of the DL connection), while the last action is activated to respond to the negotiation protocol.

The outcome of the negotiation step 402 is checked in a step 404.

If positive, the connection is admitted and control returns to the scheduler 100.

If either of steps 400 or 404 yields a negative outcome, the connection is negated (not admitted) and control returns to the scheduler 100.

The procedure used to verify if a TXOP can be allocated locally is a very simple one and can be synthesized as follows.

In the beginning, the Negotiator 101 verifies if the difference between the beacon interval and the highest OFFSET value contained in the table ALLOCATED_TXOP_TABLE is less than the TXOP duration. If this is true, the TXOP can be inserted after the last allocated TXOP. If this condition is not met the Negotiator 101 verifies if un-allocated time enough exists between two allocated TXOPs to manage the new TXOP. If also this condition is not met, a negative answer will be returned to the Scheduler, otherwise a positive answer and the value of the OFFSET will be returned.

The negotiation protocol is based on four control frames, i.e.:
DL Request
DL Acknowledgement
DL Rejection
DL Teardown The negotiation protocol is always activated using the IM, and the four control frames have different subtype fields as shown in Table 1 below.

TABLE 1

Subtype fields for each DL message

| Message | Subtype |
|---|---|
| DL Request | 1000 |
| DL Acknowledgement | 1001 |
| DL Rejection | 1010 |
| DL Teardown | 1011 |

Figure 9:
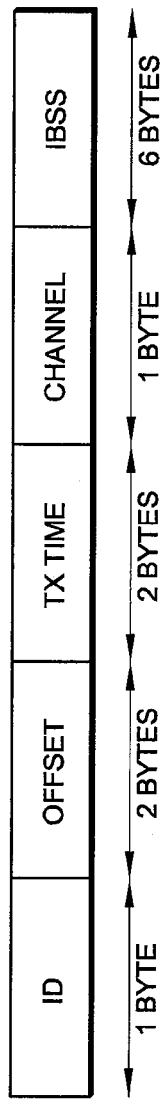
FIGS. 9 and 10 are representative of payload formats for use in the arrangement described herein.

The frame body field format (i.e. payload format) for DL Request, DL Acknowledgement and DL Rejection is represented in FIG. 9.

The field ID identifies the DL session. It can be a number in the range 0-255.

The field OFFSET represents the time of the beginning of data transmission in the DL connection; it is expressed in time units (1 time unit=1024 μs) and it is relative to the reception of the next beacon.

The field TX TIME represents the TXOP duration inside a beacon interval; it is expressed in time units.

The field CHANNEL represents the Channel ID used for the requested DL connection; it is expressed according IEEE 802.11 specifications.

The field IBSS represents the Independent Basic Service Set of the DL connection.

Figure 10:
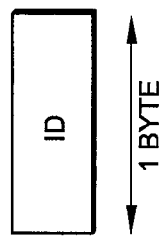

The frame body field format for DL Teardown is shown in FIG. 10 and includes a single ID field.

Figure 11:
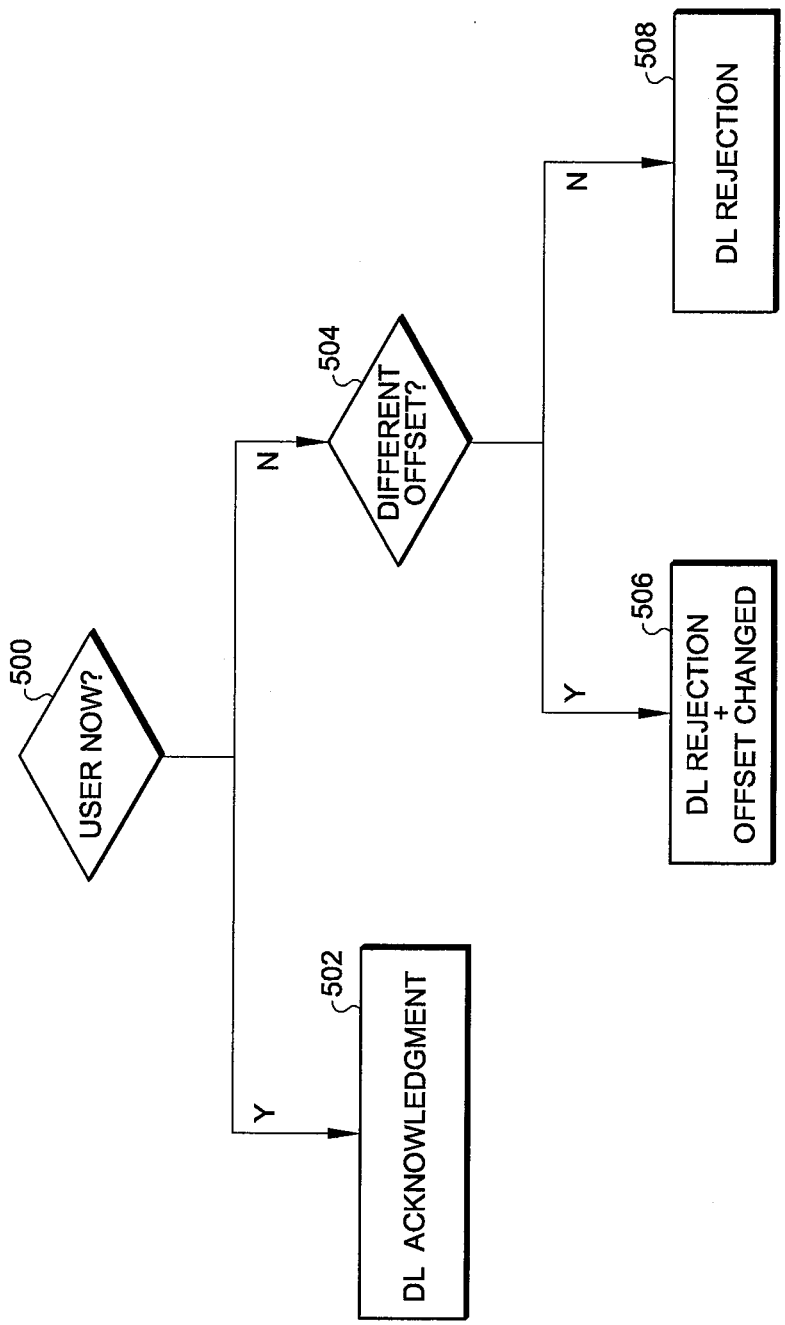
FIG. 11 is another flow chart representing certain processing steps performed within the arrangement described herein.

The flowchart of FIG. 11 relates to the answer to a DL request: a DL Request is the first message a station transmits when starting a DL session. The DL Request message will be initialized with the channel ID to be used for the DL connection, the TXOP and OFFSET values as estimated by the Scheduler 100 and Negotiator 101, respectively, the IBSS of the DL connection and, finally, the ID that identifies the DL session.

Step 500 in the flow chart of FIG. 11 is representative of the check as to whether TXOP and OFFSET can be inserted in the local ALLOCATED_TXOP table (item labeled 105 in FIG. 5).

In the positive, a DL Acknowledgement message is issued in a step 502: DL Acknowledgement is the frame a station sends to accept a DL Request. The DL Acknowledgement contains the same information of the DL Request. After sending the DL Acknowledgement, the Negotiator 101 notifies the positive response to the Scheduler 100 and then the station is ready to switch on the DL connection at the target time indicated in the DL Request. After the Negotiator 101 of the station that started the DL Request receives the DL Acknowledgement, it notifies the positive response to the Scheduler 100 and then the station is ready to switch on the DL connection at the target time indicated in the DL Request.

If the step 500 in the flow chart of FIG. 11 yields a negative outcome, a check is made in a step 504 as to whether the possibility exists of providing a different value for OFFSET. If that possibility exists, i.e. the step 504 yields a positive outcome, at step 506 a DL Rejection message is sent while changing the value for OFFSET. If, conversely, the step 504 yields a negative outcome, at step 508 the DL Rejection message is sent without making any attempt at changing OFFSET.

DL Rejection is the frame used to reject a DL Request. If the DL Rejection contains the same identical information of the DL Request (e.g. no changes in OFFSET) this means that the DL connection at the moment is not available.

However, the Negotiator 101 of the receiving station can adequately change some fields (except for the fields ID and TX TIME) of the DL Request in order to propose new parameters for the DL connection (for example it can indicate a different OFFSET field because the second Mobile Station has another on-going Direct Link connection). After sending a DL Rejection, the Negotiator 101 does not take further steps.

Two possible cases may arise when the Negotiator 101 in the sending station receives a DL Rejection, i.e.:
  if the DL Rejection contains the same identical information of the DL Request, the Negotiator 101 notifies the negative response to the Scheduler 100;
  if the DL Rejection contains some modified fields with respect to the DL Request, the Negotiator 101 can decide to change some parameters and to start a new DL Request or it can decide to notify a negative response to the Scheduler 100.

DL Teardown is used to close a DL connection. This message contains only the ID of the DL session. It can be sent by either E-STA1 or E-STA2, (i.e. the Negotiator 101 in E-STA1 could use this frame to tear down a DL connection associated to a stooped traffic stream). When a Negotiator 101 receives a DL Teardown, it sends a message to the Scheduler 100 that will delete the associated entry from the TXOP_TABLE 105. The DL Teardown message can be sent on the Infrastructure network or directly on the DL network.

To sum up:
  if the Negotiator 101 receives a DL Acknowledgement, it sends the positive response to the Scheduler 100 together with the value of OFFSET;
  if the Negotiator 101 receives a DL Rejection with the same parameters of the DL Request, it notifies a negative response to the Scheduler 100;
  if the Negotiator 101 receives a DL Rejection with some modified parameters with respect to the DL Request, it repeats the negotiation process.

The Switch Module 102 is responsible for two main tasks:
  buffering data received from the application (Switch Buffer Module); and
  enabling data transmission for allocated TXOP (Switch Transmit Module).

Figure 12:
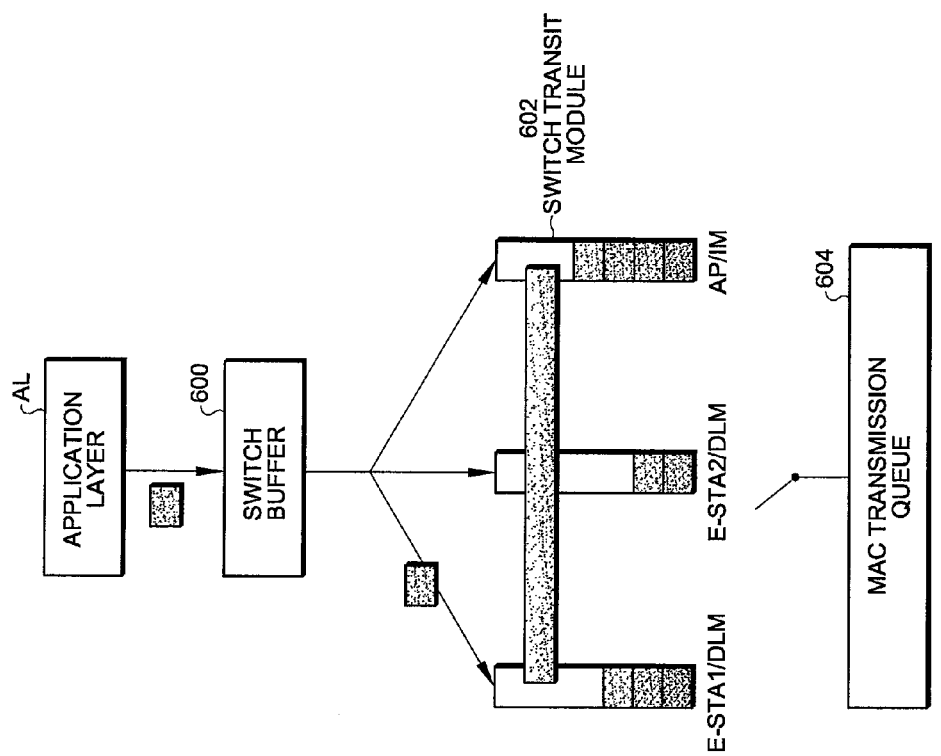
FIG. 12 is a functional diagram of switch module data flow in the arrangement described herein.

The functional diagram of FIG. 12 provides an overview of the Switch Module data flow.

As stated above, a buffer will be assumed to exist for each different destination-transmission mode pair; for IM only a buffer is needed because the destination is always the AP.

Specifically, a Switch Buffering module 600 stores the packets received from the application layer AL according to the ALLOCATED_TXOP table 105 and the TSPEC table.

Thus the data sent from the applications are not directly queued in the MAC transmission queue 604, but are buffered in intermediate queues or Application Buffers (designated 602 in FIG. 12). A data packet is sent by application along with information on the TSPEC_ID and destination address.

Only one application buffer 602 at a time is enabled to transmit data. The buffer 602 in question is enabled by the Switch Transmit Module according to the information contained in the ALLOCATED_TXOP table, i.e. the Switch Transmit Module selects the buffer 602 enabled to transmit according to ALLOCATED_TXOP table.

The Switch Transmit block is characterized by a separated thread synchronized with the beacon interval. Each time a station receives a beacon, a timer starts and the Switch Transmit Module, accessing to the information contained in the ALLOCATED_TXOP table, performs the necessary operation to switch from a TXOP to the other. When the station does not receive the beacon, the timer is reset after the nominal duration of the beacon interval.

Switching between two TXOPs that work in different transmission modes requires a change in the PHY and MAC layer (different channel, transition from infrastructure to ad-hoc mode).

IM is considered as the default transmission mode: this means that non-allocated intervals are considered as IM TXOPs. In any case, the Scheduler 100 will be able to decide to switch from DLM to IM when no allocated TXOP exists; this decision will take into account the time required to pass from DL to IM and from IM to DL. For example, it can happen (see e.g. the case of STA1 in FIG. 3) that two subsequent TXOPs on DLM are scheduled far away from each other, then it is up to the Switch 102 to decide if is appropriate to switch from DLM to IM.

The statistics monitor 103 of FIG. 5 is responsible for maintaining an updated "snapshot" of the network statistics. These statistics are stored in the METRIC table 104. Statistics are maintained on a per-link basis and update should be performed each time a TXOP is terminated The following is a further detailed, exemplary description of how some of the modules introduced in the foregoing can be implemented. Network statistics are introduced to be maintained for each link (METRIC table contents) to show then how these statistics can be aggregated to estimate path network metrics. Finally, exemplary implementations for the QoSMetric(P,F), Cost(P,F), TXOP estimation and run-rime monitoring of QoS are discussed.

A STA maintains the network statistics associated to each link in the METRIC table 104.

Preferably, the entries for this table are estimated as follows:

$$\text{METRIC\_TABLE}.PER(t) = 1 - \frac{NumPktAcked(t)}{NumPktSent(t)}$$

where NumPktSent(t) is the number of packets sent over the link:
METRIC_TABLE.Source→METRIC_TABLE.Dest over the channel METRIC_TABLE.Channel, while NumPktAcked(t) is the number of acknowledged packets over the same link.

A METRIC_TABLE.LinkCapacity for outgoing links (i.e. with Source equal to the STA address) is estimated as the ratio of the total number of successfully sent bytes in a given time interval t to the length (duration) t of the interval, where the interval t considered for the estimation is the TXOP duration. For incoming links this is estimated as the ratio of the total number of successfully received bytes after sending a PS-POLL to the time between the PS-POLL sending and the ACK reception.

A METRIC_TABLE.MeanPHYRate is estimated as:

$$\begin{cases} MeanPHYrate(0) = CurrentPHYrate(0) \\ MeanPHYrate(t) = a_1 MeanPHYrate(t-1) + a_2 CurrentPHYrate(t) \\ a_1 + a_2 = 1 \; a_1, a_2 \geq 0 \end{cases}$$

where CurrentPHYrate is the current PHY rate used for a transmission attempt. The PHY rate used to transmit packets is, usually, an available information in the wireless card driver. The parameters $a_1$, and $a_2$ are implementation dependent and should be determined experimentally.

The Path Network Metrics (path metrics) are used in the QoSMetric and Cost functions. In a preferred exemplary embodiment the following metrics are considered:

TABLE 2

Path Network Metrics

| Metric | Estimation | Reliability for PDL | Reliability for PI |
|---|---|---|---|
| P.length | $\Sigma_{l \in Pl} 1$ | High | High |
| P.PER | $\sum_{i=1}^{P.length} \left[ \prod_{j=1}^{i-1} (1 - l.PER_j) \right] \cdot l.PER_i$ | High | Low (for the second hop) |
| P.buffer | $(\Sigma_{n \in Pn} n.buffer)/(P.hop - 1)$ | High | Low (for the second hop) |
| P.LinkCapacity | $\min_{l \in Pl} l.LinkCapacity$ | High | Low |
| P.PHYRate | $\min_{l \in Pl} l.MeanPHYRate$ | High | Low |

The information on the metrics associated to the single links (referred as l. in the table above table) is stored in the table 105 (see Table 5).

As example, if one wishes to compute PER for the infrastructure path between STA1 and STA2 one has:

$$PDL.PER = PER_{STA1,AP} + (1 - PER_{STA1,AP}) \cdot PER_{AP,STA2}$$

Since estimating the value for $PER_{AP,STA2}$ is not trivial, the computation of P.PER is simplified, setting $PER_{AP,STA2}$ equal to 0. Hence:

$$P.PER = PER_{STA1,AP}$$

For the same example the formula for the computation of PDL.PHYRate is:

$$PDL.PHYRate = \min\{MeanPHYRate_{STA1,AP}, MeanPHYRate_{AP,STA2}\}$$

Similarly, since estimating the value of $MeanPHYRate_{AP,STA2}$ is not trivial, the computation of P.PHYRate has been simplified, setting $MeanPHYRate_{AP,STA2}$ equal to the maximum possible value of the physical rate. Hence, P.PHYRate can be considered equal to $MeanPHYRate_{STA1,AP}$ that is the mean physical rate of the first link.

In the presently preferred embodiment, the function QoS-Metric will return 1 if all of the following conditions are verified:

$$P.PER < TSPEC.PER$$

$$P.\text{LinkCapacity} >= \Sigma_{f \in P_f} TSPEC(f).\text{MeanDataRate}$$

where TSPEC(f).MeanDataRATE is the mean data rate indicated in the TSPEC of the i-th flow on the link. Because many TSs can insist on a single link we must consider the aggregated data rate.

If these two conditions are verified, one is able to allocate a TXOP on that path that can guarantee the QoS application requirements. In any case, this does not imply that the TXOP will be effectively allocated. The allocation depends also on the available, un-assigned time in the beacon interval; this verification will be performed by the Negotiator 101.

The Cost function will be typically computed as follows:

$$\text{Cost}(P) = 1 - \left( \alpha \cdot \frac{1}{P.length} + \beta \cdot \frac{1 - P.PER}{1 + k \cdot P.PER} + \gamma \cdot \frac{P.PHYRate}{PHYRate_{max}} \right)$$

where α, β, γ are the weights of the functions that represent the cost function of the number of the hops in the path, the cost function of the PER in the path and the cost function of the mean physical rate in the path, respectively.

If one assumes that:

$$\begin{cases} 0 \le \alpha, \beta, \gamma \le 1 \\ \alpha + \beta + \gamma = 1 \end{cases}$$

P.length will represent the number of hops in the path; P.PER will represent the PER estimated on the path (path with lower PER are preferred); k will represent a constant value that is fixed to 8 for the exemplary implementation discussed herein; P.PHYRate is the mean physical rate of the path; PHYRate$_{max}$ is the maximum physical rate of the wireless card (path that can use the maximum PHY rate are preferred).

The Cost function will ensure that the selected path is the one that will provide the lowest duration for the estimated TXOP.

As stated previously, TXOP should be estimated using a subset of the information contained in the TXOP and METRIC_TABLE data structures. As indicated, various different ways exist for estimating TXOP: two of these will now be discussed by way of example.

The former is one where the computation of the TXOP uses the following fields:

TSPEC.Mean_Data_Rate (ρ),
TSPEC.Nominal_MSDU_size (L),
TSPEC.Maximum_MSDU_Size (M),
P.PHYRate (R) (associated to the selected path and the overheads (O).

The Service Interval (SI) is equal to the beacon interval, and the number of MSDUs that are transmitted at the Mean Data Rate during the Service Interval can be computed as:

$$N_i = \left\lceil \frac{SI \times \rho_i}{L_i} \right\rceil$$

Then the TXOP duration is the maximum time to transmit frames at Ri and time to transmit one maximum size MSDU (plus overheads) at Ri:

$$\text{TXOP\_firstMethod}_i = \max\left( \frac{N_i \times L_i}{R} + O, \frac{M}{R} + O \right)$$

The term O takes into account overhead related to MAC protocol, and is estimated as follows:

$$O = o \cdot N_i$$

In the case of 802.11 legacy protocol, o can be computed as:

$$o = T_{PHY} + SIFS + T_{ACK} + DIFS + n \cdot \text{Timeslot}$$

where, $T_{PHY}$ is the time necessary to transmit the 802.11 PHY preamble. $T_{ACK}$ is the time necessary to transmit an acknowledgment frame, that is transmitted at the same rate of the data packets. The value of n consider backoff overhead, we set n to $CW_{min}/2$ (e.g. for the legacy 802.11b WLAN card the minimum value of CW is 31, then n=16).

An extra band allocation is helpful in managing path packet error rate and possible delay in the switching process. This is obtained using a surplus factor that is fixed to 8% of the total computed TXOP.

Another way of estimating TXOP is based on the exploitation of the METRIC_TABLE.LinkCapacity (LC). The link capacity is good information about the maximum speed of a link and includes also possible overhead related to protocol and retransmission. The TXOP could be estimated as:

$$\text{TXOP\_secondMethod}_i = \max\left( \frac{N_i \times L_i}{LC}, \frac{M}{LC} + O \right)$$

Run-Time Monitoring of QoS

Channel link conditions can be captured by means of two network statistics: PER and mean PHY data rate. Consequently, one may assume that a new evaluation of the path and the TXOP should be considered if these parameters change over a given threshold.

Run-time monitoring will preferably follow this procedure:

```
If    METRIC_TABLE.PER    is    different    from    the
ALLCATED_TXOP_TABLE.PER used to estimate TXOP
    Or
    METRIC_TABLE.MeanPHYRate                    (or
    METRIC_TABLE.LinkCapacity) is different from the one
    used         to        estimate       the       TXOP
    (ALLOCATED_TXOP_TABLE.MeanPhyRate            or
    ALLOCATED_TXOP_TABLE.LinkCapicity)
        Then return 1
        Else return 0
```

Preferred embodiments of the data structures involved in operation of the arrangement described herein will now be detailed.

TSPEC

Table 3 herein shows the TSPEC structure (TSPEC_TABLE)

TABLE 3

| TSPEC ID | Nominal MSDUSize | Maximum MSDUSize | Minimum Service Interval | Minimum Data Rate | Mean Data Rate |
|---|---|---|---|---|---|
|  |  |  |  |  |  |

| PeakDataRate | PER | DelayBound | MinimumPHYRate |
|---|---|---|---|
|  |  |  |  |

This table contains a subset of the information included in the 802.11e TSPEC information field plus some additional field needed for our application.

TSPEC_ID(Primary Key)
The unique identifier of a TSPEC.

NominalMSDUSize
Nominal size, in octets, of MSDUs belonging to this TSPEC

MaximumMSDUSize
Maximum size, in octets, of MSDUs belonging to this TSPEC

MinimumServiceInterval
This is an unsigned integer that specifies the minimum interval, in units of microseconds, between the start of two successive service periods.

MinimumDataRate
This contains an unsigned integer that specifies the lowest data rate, in units of bits per second, for transport of MSDUs belonging to this TSPEC within the bounds of this traffic specification. The Minimum Data Rate does not include the MAC and PHY overheads incurred in transferring the MSDUS.

MeanDataRate
This contains an unsigned integer that specifies the mean data rate, in units of bits per second, for transport of MSDUs belonging to this TSPEC within the bounds of this traffic specification. The Minimum Data Rate does not include the MAC and PHY overheads incurred in transferring the MSDUs.

PeakDataRate
This contains an unsigned integer that specifies the maximum allowable data rate in units of bits/second, for transfer of the MSDUs belonging to this TSPEC within the bounds of this traffic specification. If "p" is the peak rate in bit/s, then the maximum amount of data, belonging to this TS, arriving in any time interval [t1,t2], where t1<t2 and t2−t1>1 TU, does not exceed p*(t2−t1) bits.

PER
This contains an unsigned integer that specifies the maximum packet error rate an application can tolerate, measured at application level.

DelayBound
This contains an unsigned integer that specifies the maximum amount of time, in units of microseconds, allowed to transport an MSDU belonging to the TS in this TSPEC, measured at application level.

MinimumPHYRate
This contains an unsigned integer that specifies the desired minimum PHY rate to use for this TS, in units of bits per second, that is required for transport of the MSDUs belonging to the TS in this TSPEC.

Allocated TXOP table
Table 4 below is representative of Allocated TXOP (ALLOC_TXOP_TABLE)

TABLE 4

| ID | TSPEC_ID | IBSS | TXOP | Offset | Source | Dest | Channel Number | PER |
|---|---|---|---|---|---|---|---|---|

| Offset | LinkCapacity | MeanPHYRate | Nhop |
|---|---|---|---|

ID (Primary Key)
This field represents the identifier of the DL session; it is used in the signalling protocol messages.

TSPEC_ID (Foreign Key)
This is the identifier of the TSPEC allocated to this TXOP IBSS
This field represents the Independent Basic Service Set of the DL connection; it is always the same for all DL connections.

TXOP
This field represents the duration of the data transmission inside the Service Interval.

Offset
This field is the starting time inside the Service Interval for the TXOP that has to be negotiated; it is used in the signalling protocol messages.

Source
This field represents the MAC address of the sender of a DL traffic stream.

Dest
This field represents the MAC address of the receiver of a DL traffic stream.

Channel Number

This field represents the channel number of the DL connection; it is considered fixed in our implementation.

PER

This field represents the value of the Packet Error Rate used to estimate the TXOP.

MeanPHYRate

This field is the average physical data rate used to estimate the TXOP duration.

LinkCapacity

This field is the LinkCapacity used to estimate the TXOP duration.

Nhop

This field represents the number of hops needed to go from the transmitter to the receiver; in the case of DL connection this value is 1, in the case of Infrastructure network this value is 2.

A special entry in this table is the one relative to the incoming traffic (Sender addr=AP), this entry is always present in the table and must be updated periodically.

Network Metrics Table

Table 5 is representative of the metrics for single links (METRIC_TABLE)

TABLE 5

| Source | Dest | Channel | PER | Mean PHYRate | Link Capacity | Timestamp_update |
|--------|------|---------|-----|--------------|---------------|------------------|

The table key is given by <Source, destination, channel>

Source (Primary Key)

Link node id source

Dest (Primary Key)

Link node id destination

Channel (Primary Key)

The channel id the statistics are referred to

PER

The estimated PER on that link

MeanPHYRate

The average PHY data rate used for single transmission attempts. It is referred to the data rate used to transmit MAC header and packet payload.

LinkCapacity

This is a measure of the effective maximum speed of a link, it includes overhead related to retransmission, header transmission, protocol overhead, traffic load, etc.

Timestamp_Update

This is the timestamp of the last time the row was updated.

Without prejudice to the underlying principles of the invention, the details and the embodiments may vary, even appreciably, with reference to what has been described by way of example only, without departing from the scope of the invention as defined by the annexed claims.

The invention claimed is:

1. A method of operating a basic service set of a wireless communication network comprising an access point and a plurality of stations, the method comprising:

sending periodic information arranged in time frames to said plurality of stations by said access point;

communicating by said plurality of stations in a first mode through said access point;

communicating directly between stations in a second mode, without using said access point;

partitioning said time frames into a first time interval wherein said plurality of stations communicate in said first mode over a first channel, a second time interval wherein said plurality of stations communicate in said second mode over a second channel, and a third time interval wherein said plurality of stations communicate in either said first or second mode; and negotiating communication in said second mode between a transmitter station and a receiver station in said plurality of stations including allocating direct link transmission opportunities, in the form of bounded time intervals defined by a starting time and a maximum duration, in which said transmitter station is allowed to communicate in the second mode with said receiver station, wherein the maximum duration is defined based upon application quality of service requirements including data rate, data unit size, overhead and at least one of physical rate and link capacity.

2. The method of claim 1, wherein said first time interval has a fixed length.

3. The method of claim 1, wherein the data rate comprises a mean data rate, the data unit size comprises a nominal MAC service data unit size and a maximum MAC service data unit size, and the physical rate comprises a mean physical rate.

4. The method of claim 1, further comprising: negotiating said starting time between said transmitter station and said receiver station in said plurality of stations.

5. The method of claim 4, further comprising: said transmitter station and said receiver station in said plurality of stations negotiating said starting time to prevent overlapping of said direct link transmission opportunities.

6. The method of claim 1, further comprising: said plurality of stations selecting a transmission mode between said first mode and said second mode for a given traffic stream as a function of at least one of: (a) quality of service requirements of said given traffic stream and (b) availability of communication resources of said wireless communication network.

7. The method of claim 6, further comprising: said plurality of stations selecting, as the transmission mode for a given traffic stream, between said first mode and said second mode using a path metric defined on a path and said given traffic stream in said wireless communication network, wherein said metric is a product of a first component taking into account quality of service requirements of said given traffic stream and a second component indicative of a cost of the communication resources of said wireless communication network.

8. The method of claim 1, further comprising: said plurality of stations switching between said first mode and said second mode upon a variation in operating conditions of said wireless communication network.

9. The method of claim 1, further comprising: at least one of said plurality of stations maintaining simultaneous communication in said first mode and said second mode over different channels in said wireless communication network.

10. The method of claim 1, further comprising: buffering data in at least one of said plurality of stations as said at least one of said plurality of stations switches between said first mode and said second mode.

11. The method of claim 1, further comprising: storing, at said access point, data to be sent in said first mode to at least one of said plurality of stations while said at least one of said plurality of stations is in said second mode; and said access point sending said data stored therein to said at least one of said plurality of stations.

12. The method of claim 11, further comprising: said access point sending said data stored therein to said at least one of said plurality of stations as said at least one of said plurality of stations switches back to said first mode.

13. The method of claim 11, further comprising: said access point considering any of said plurality of stations operating in said second mode as a station in power save mode.

14. The method of claim 13, further comprising: said access point sending said data stored therein to said at least one of said plurality of stations as said at least one of said plurality of stations periodically awakens from said in power save mode.

15. A station of a basic service set of a wireless communication network, the wireless communication network comprising an access point and a plurality of stations, with said access point operative to send towards said plurality of stations periodic information arranged in time frames, said station comprising:
a processor; and
a memory, wherein the memory stores software code that, when executed by the processor, causes the station to:
schedule communication of said station with at least one homologous station in said wireless communication network in a first mode, through said access point, and in a second mode directly with said homologous station without using the access point,
negotiate communication in said second mode with said at least one homologous station including allocating direct link transmission opportunities, in the form of bounded time intervals defined by a starting time and a maximum duration, in which said station is allowed to communicate in the second mode with said homologous station, wherein the maximum duration is defined based upon application quality of service requirements including data rate, data unit size, overhead and at least one of physical rate and link capacity, and
communicate (a) in said first mode over a first channel in a first time interval of said time frames, (b) in said second mode over a second channel in a second time interval of said time frames, and (c) in either of said first or second mode in a third time interval of said time frames.

16. The station of claim 15, wherein said first time interval has a fixed length.

17. The station of claim 15, wherein the data rate comprises a mean data rate, the data unit size comprises a nominal MAC service data unit size and a maximum MAC service data unit size, and the physical rate comprises a mean physical rate.

18. The station of claim 15, wherein the processor is configured for negotiating said starting time between said station and said homologous station.

19. The station of claim 18, wherein the processor is configured for negotiating said starting time to prevent overlapping of said direct link transmission opportunities.

20. The station of claim 15, wherein the processor is further configured to switch between said first mode and said second mode for a given traffic stream as a function of at least one of: (a) quality of service requirements of said given traffic stream and (b) availability of communication resources of said wireless communication network.

21. The station of claim 20, wherein the processor is configured for switching between said first mode and said second mode for the given traffic stream on the basis of a path metric defined on a path and a traffic stream in said network, wherein said metric is a product of a first component taking into account said quality of service requirements of said given traffic stream and a second component indicative of a cost of said communication resources of said wireless communication network.

22. The station of claim 21, wherein the processor is configured for switching between said first mode and said second mode upon a variation in the operating conditions of said wireless communication network.

23. The station of claim 15, wherein the processor is configured for maintaining simultaneous communication in said first mode and said second mode over different channels in said wireless communication network.

24. The station of claim 15, wherein the processor is further configured for buffering data as said station switches between said first mode and said second mode.

25. The station of claim 15, wherein the processor is configured for receiving from said access point data which are: (a) stored at said access point while said station was in said second mode; and (b) sent to said station in said first mode.

26. The station of claim 25, wherein the processor is configured for receiving from said access point said data stored therein as said station switches back to said first mode.

27. The station of claim 25, wherein the processor is configured for presenting itself to said access point as a station in power save mode when said station operates in said second mode.

28. The station of claim 27, wherein the processor is configured for receiving from said access point said data stored therein when said station periodically awakens from said power save mode.

29. A wireless communication network including a plurality of stations according to claim 15.

30. A computer program product embodied on a non-transitory computer readable medium, loadable into (a) the memory of a computer at an access point in a basic service set of a wireless communications network and (b) computers of a plurality of stations in the wireless communications network, and including software code that when executed causes:
the access point to send periodic information arranged in time frames to the plurality of stations in the basic service set;
the plurality of stations to communicate in a first mode through the access point; at least one station of the plurality of stations to communicate in a second mode directly with at least one other station without using the access point;
the access point to partition the time frames into a first time interval wherein the plurality of stations communicate in the first mode over a first channel, a second time interval wherein the plurality of stations communicate in the second mode over a second channel, and a third time interval wherein the plurality of stations communicate either in the first or second mode; and a transmitter station to negotiate communication in the second mode with a receiver station, wherein the transmitter station and the receiver station are in the basic service set, including allocating direct link transmission opportunities, in the form of bounded time intervals defined by a starting time and a maximum duration, in which said transmitter station is allowed to communicate in the second mode with said receiver station, wherein the maximum duration is defined based upon application quality of service requirements including data rate, data unit size, overhead and at least one of physical rate and link capacity.

* * * * *